(12) United States Patent
Blumenkranz

(10) Patent No.: US 7,683,732 B1
(45) Date of Patent: Mar. 23, 2010

(54) CONTINUOUSLY ADJUSTABLE EQUALIZER

(75) Inventor: Robert M. Blumenkranz, Brea, CA (US)

(73) Assignee: Main Line Equipment, Inc., Torrance, CA (US)

( * ) Notice: Subject to any disclaimer, the term of this patent is extended or adjusted under 35 U.S.C. 154(b) by 0 days.

(21) Appl. No.: 12/275,139

(22) Filed: Nov. 20, 2008

(51) Int. Cl.
*H03H 7/03* (2006.01)
*H04B 3/14* (2006.01)

(52) U.S. Cl. .................................... 333/18; 333/28 R

(58) Field of Classification Search ................ 333/18, 333/28 R, 81 R, 81 A
See application file for complete search history.

(56) References Cited

U.S. PATENT DOCUMENTS

| | | | |
|---|---|---|---|
| 4,061,970 A | 12/1977 | Magneron | |
| 4,947,386 A | 8/1990 | Preschutti | |
| 5,506,549 A | 4/1996 | Crutcher | |
| 5,738,525 A | 4/1998 | Davies | |
| 5,990,929 A | 11/1999 | Sandaluk | |
| 6,785,907 B1 | 8/2004 | Dan et al. | |
| 7,039,942 B2 | 5/2006 | Dan et al. | |

*Primary Examiner*—Stephen E Jones
(74) *Attorney, Agent, or Firm*—SoCal IP Law Group LLP; Michael D. Harris; Steven C. Sereboff

(57) ABSTRACT

There is disclosed a continuously variable equalizer. The continuously variable equalizer may include a series-tuned circuit connected between an RF signal input terminal and an RF signal output terminal. An adjustable T-pad may have an input terminal coupled to the RF signal input terminal, an output terminal coupled to the RF signal output terminal, and a common terminal. A parallel-tuned circuit may be coupled between the T-pad common terminal and a signal return.

4 Claims, 4 Drawing Sheets

CONTINUOUSLY ADJUSTABLE EQUALIZER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the transmission of signal over a frequency-dependent transmission medium, and particularly to the use of equalizers on a coaxial cable signal transmission system.

2. Description of the Related Art

Coaxial cable transmission systems transmit cable television and broadband communications signals. The coaxial cables in these systems are relatively long. Over long distances, intrinsic resistive and dielectric losses in the coaxial cable may cause significant signal attenuation. The attenuation is typically dependent on cable length and on the frequency of the transmitted signal. The attenuation is greatest at the high frequency end of the bandwidth and decreases as frequency decreases. Thus the high frequency components of a broadband signal may be attenuated substantially with respect to the low frequency components. The change in attenuation with frequency is commonly referred to as "slope loss".

An equalizer is a cable system component that has essentially the opposite loss versus frequency characteristic from that of the cable itself. An equalizer provides a predetermined loss at the lower end of the broad band signal spectrum and a small loss or no loss at the high end of the frequency spectrum. Thus an equalizer may be used to compensate for the slope loss of a length of coaxial cable.

Conventional cable systems use combinations of amplifiers and equalizers spaced throughout the coaxial cable network to compensate for attenuation and slope loss. Since the amount of attenuation and slope loss is dependent on the length of cable feeding a specific location, each location in the system may require different amplifier gain and equalizer attenuation.

Amplifier manufacturers typically produce a range of equalizers with different equalization characteristics. During the installation or reconfiguration of a cable system, technicians may test the signal strength and slope at particular locations, and select and install appropriate amplifiers and equalizers for each location. In some portions of the country, reselection and replacement of the equalizers may also be required seasonally to compensate for wide variations in average temperature. Periodic reselection and replacement of the equalizers may also be required to compensate for degradation and aging of cable system components.

Currently, the equalization at a specific location in a cable system may be "adjusted" by unplugging the existing equalizer and installing a new equalizer having a different predetermined attenuation at lower frequency. Equalizers are available in a limited number of attenuation values, such as 1 dB increments, so that some residual slope loss may remain even after the best available equalizer is installed. Alternatively, a resistive pad or another portion of the existing equalizer may be unplugged and replaced to provide different slope loss compensation. Resistive pads are also available only in finite attenuation values, so that some residual slope loss may remain even after the best available resistive pad is installed.

Whether the entire equalizer or a portion of an equalizer is replaced, signal transmission to locations downstream from the location being serviced will be interrupted while the equalizer or pad is unplugged. Though a brief interruption of cable television service may seem merely an inconvenience, many cable subscribers use broadband cable Internet access instead of dial-up or DSL Internet access. In addition, many cable subscribers who use cable for Internet access also use the Internet for telephone communication. Some users only have telephone service by way of an Internet connection via the cable system. Interrupting telephone service might prevent a user from making or receiving an emergency or urgent telephone call. Interrupting any call may result in termination of the call, necessitating that the call be reconnected after the cable service is restored.

The Internet also allows collaborative work around the world. Interrupting people doing this type of work can damage business people who need quick decisions and rely on completing the work as soon as possible. Interrupting long file transfers can require restarting the file transfer, with the waste of significant time and bandwidth.

DETAILED DESCRIPTION

Description of Apparatus

Figure 1:
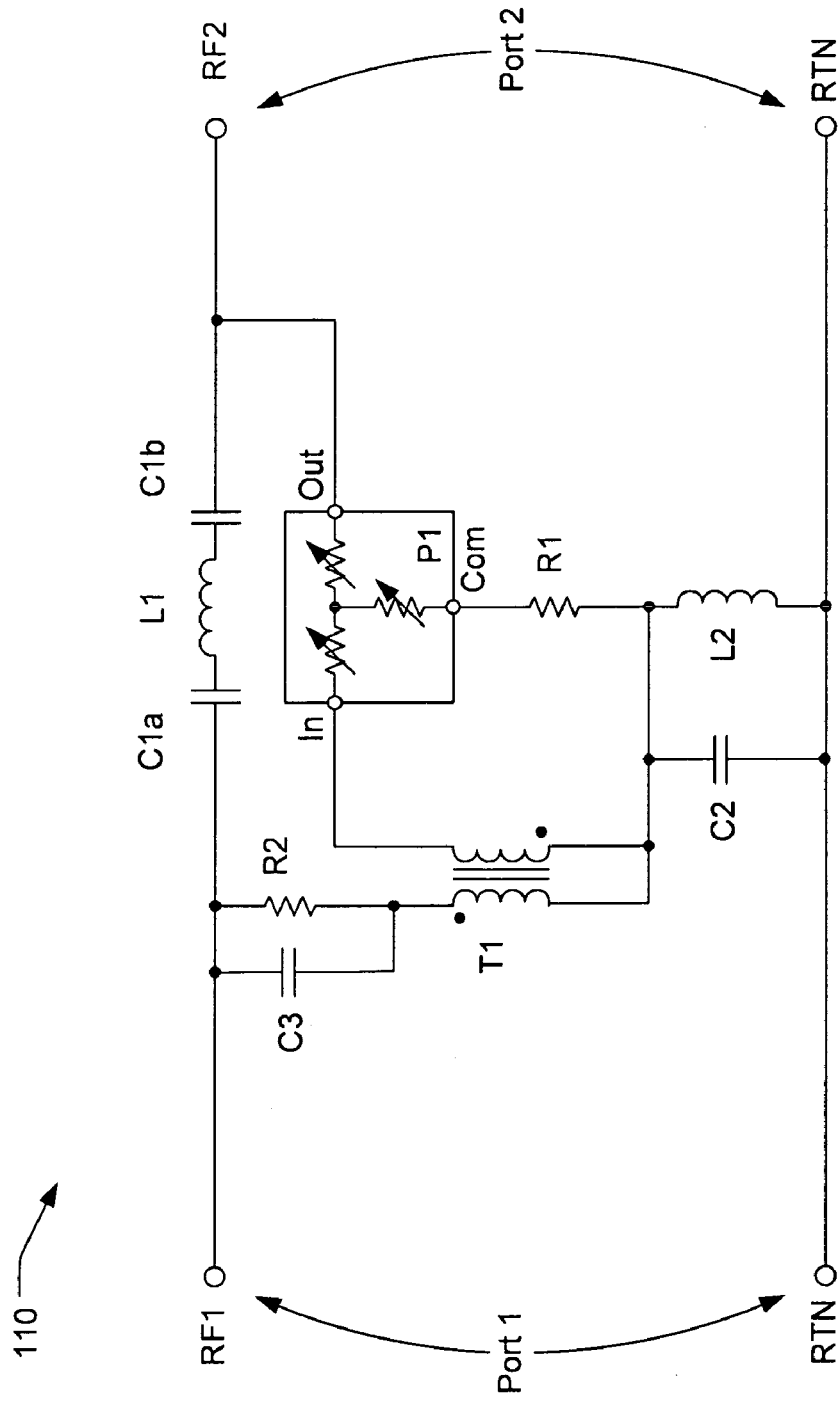
FIG. 1 is a schematic diagram of a continuously variable equalizer.

Referring now to FIG. 1, a continuously adjustable equalizer circuit 110 may allow accurate compensation for slope loss in a cable transmission system without interrupting communications to downstream locations. The continuously adjustable equalizer circuit 110 may have a first port, Port 1, consisting of an RF terminal (RF1) and an associated return (RTN) terminal. The continuously adjustable equalizer circuit 110 may have a second port, Port 2, consisting of an RF terminal (RF2) and an associated RTN terminal. Each of the RF1, RF2, and RTN terminals may be a pin, a solder terminal, a pad, a contact, or other device for establishing electrical connections between the continuously adjustable equalizer circuit 110 and a cable transmission system.

The following description assumes that an RF input signal is applied Port 1 and an equalized RF output signal is output from Port 2. However, the continuously variable equalizer 110 may be operated in reverse, with an RF input signal applied to Port 2 and the equalizer RF output signal output from Port 1.

The continuously adjustable equalizer circuit 110 may include a series tuned circuit, comprising a first inductor L1 and one or more first capacitors C1$a$, C1$b$, connected between the RF1 and RF2 terminals. In this patent, the term "connected" means a direct electrical connection, and the term "coupled" means an electrical connection that may be made by way of intervening components. The continuously adjustable equalizer circuit 110 may include a miniature adjustable T-pad P1 having a output terminal (Out) connected to the RF2 terminal, an input terminal (In) coupled to the RF1 terminal and a common terminal (Com) coupled to the RTN terminals through a parallel tuned circuit. The parallel tuned circuit may comprise a second inductor L2 and a second capacitor C2.

A T-pad is a known attenuator circuit that attenuates an input signal by a predetermined amount to provide an attenuated output signal while maintaining a specific input and output impedance. The cable television industry has standardized on an impedance of 75 ohms for all equipment. A continuously adjustable equalizer circuit 110 for use in a cable television transmission system may include a miniature variable T-pad P1 that maintains a fixed input and output impedance of 75 ohms.

The miniature adjustable T-pad P1 may include three variable resistors that are simultaneously adjusted by way of a common adjustment mechanism. The adjustment mechanism may be, for example, a shaft rotatable using a knob or screwdriver. The resistance of the three variable resistors may be adjusted such that the attenuation of the adjustable T-pad may be adjusted from near-zero to a predetermined maximum attenuation while maintaining constant input and output impedance values, which may be, for example, 75 ohms. The predetermined maximum attenuation may be, for example, 10 dB or 20 db, or some other maximum attenuation value.

The input terminal of the adjustable T-pad P1 may be coupled to the RF1 terminal through a balun transformer T1 and a parallel RC circuit consisting of resistor R2 and capacitor C3. The balun transform T1 may be connected to introduce a phase reversal, such that a RF signal component coupled through the series tuned circuit (L1/C1$a$/C1$b$) and a RF signal component coupled through the adjustable T-pad P1 may be reversed in phase. Thus, the RF output signal at the RF2 terminal may be formed by a RF signal component coupled through the series tuned circuit (L1/C1$a$/C1$b$) minus a RF signal component coupled through the adjustable T-pad P1.

An ideal series-tuned circuit has zero impedance at its resonant frequency, and an ideal parallel-tuned circuit has infinite impedance at its resonant frequency. The series-tuned circuit (L1/C1$a$/C1$b$) and the parallel-tuned circuit (L2/C2) may each have a resonant frequency near the upper frequency of the broadband spectrum transmitted over the cable system. The series-tuned circuit (L1/C1$a$/C1$b$) and the parallel-tuned circuit (L2/C2) may have the same resonant frequency or different resonant frequencies. Since the series-tuned circuit (L1/C1$a$/C1$b$) and the parallel-tuned circuit (L2/C2) may each have a resonant frequency near the upper frequency of the broadband spectrum, a signal at the upper frequency of the broadband spectrum may be coupled from the RF1 terminal to the RF2 terminal through the low impedance of the series-tuned circuit (L1/C1$a$/C1$b$), while the high impedance of the parallel-tuned circuit (L2/C2) may effectively isolate the common terminal of the adjustable T-pad P1 from the RTN terminals. Thus a signal at the upper frequency of the broadband spectrum may be coupled from the RF In terminal to the RF Out terminal with little or no attenuation.

At frequencies far removed from the resonant frequency, a series-tuned circuit may have very high impedance, and a parallel-tuned circuit may have low impedance. Thus, at the low frequency end of the broadband spectrum transmitted over the cable system, the series-tuned circuit (L1/C1$a$/C1$b$) may be essentially an open-circuit and the parallel-tuned circuit (L2/C2) may be essentially a short circuit. In this case, the RF1 terminal may be coupled to the RF2 terminal via the adjustable T-pad P1, the balun transformer T1 and the parallel RC circuit (R2/C3). The equalized RF Output signal output from Port 2 may be attenuated, at the low frequency end of the broadband spectrum, by an adjustable amount determined primarily by the setting of the adjustable T-pad P1.

The parallel RC circuit (R2/C3) may be effective to shape, at least in part, an attenuation versus frequency characteristic of the continuously variable equalizer 110 at the low frequency end of the broadband spectrum. A resistor R1 may be connected in series with the Com terminal of the adjustable T-pad P1. The value of the resistor R1 may be set to trim the maximum attenuation provided by the continuously variable equalizer 110.

The resistance, capacitance, and inductance values of the various components may depend upon the application. The values of the various components may depend, for example, on the required input and output impedances of the continuously variable equalizer 110, the desired adjustment range for the maximum attenuation, and the operating frequency spectrum. The values of the various components may be selected both to provide the desired attenuation range and to limit the return loss from either port.

The continuously variable equalizer 110 may operate over an operating frequency range from, for example, 50 MHz to 1 GHz. The continuously variable equalizer 110 may operate over an operating frequency range which encompasses standard cable TV channels 2 (55.25 MHz video carrier frequency) through 158 (997.25 MHz video carrier frequency). The insertion loss of the continuously variable equalizer at the upper operating frequency may be less than or equal to 1 dB. The attenuation provided by the continuously variable equalizer 110 at the lowest operating frequency may be adjustable from 1 dB to 10 dB or 20 dB or some other maximum value. The return loss of the miniature variable equalizer may be greater than 18 dB, referenced to 75 ohms, over the operating frequency range.

Each of the resistors, capacitors, and inductors shown in FIG. 1 may be a lumped or discrete component. Each of the capacitors and inductors shown in FIG. 1 may be a distributed component formed, for example, by traces or patterns on a printed wiring board, or a combination of discrete and distributed elements.

To allow the continuously variable equalizer 110 to operate as intended at frequencies up to 1 GHz, parasitic components such as the inductance of traces on a printed circuit card and/or stray capacitances between or within components must be considered in the design. The adjustable T-pad P1 may be configured to have low stray capacitance and parasitic inductance such that the adjustable T-pad P1 functions as a predominantly resistive component even at frequencies up to 1 GHz. The adjustable T-pad P1 may incorporate film resistive elements, rather than wire-wound resistive elements.

Figure 2:
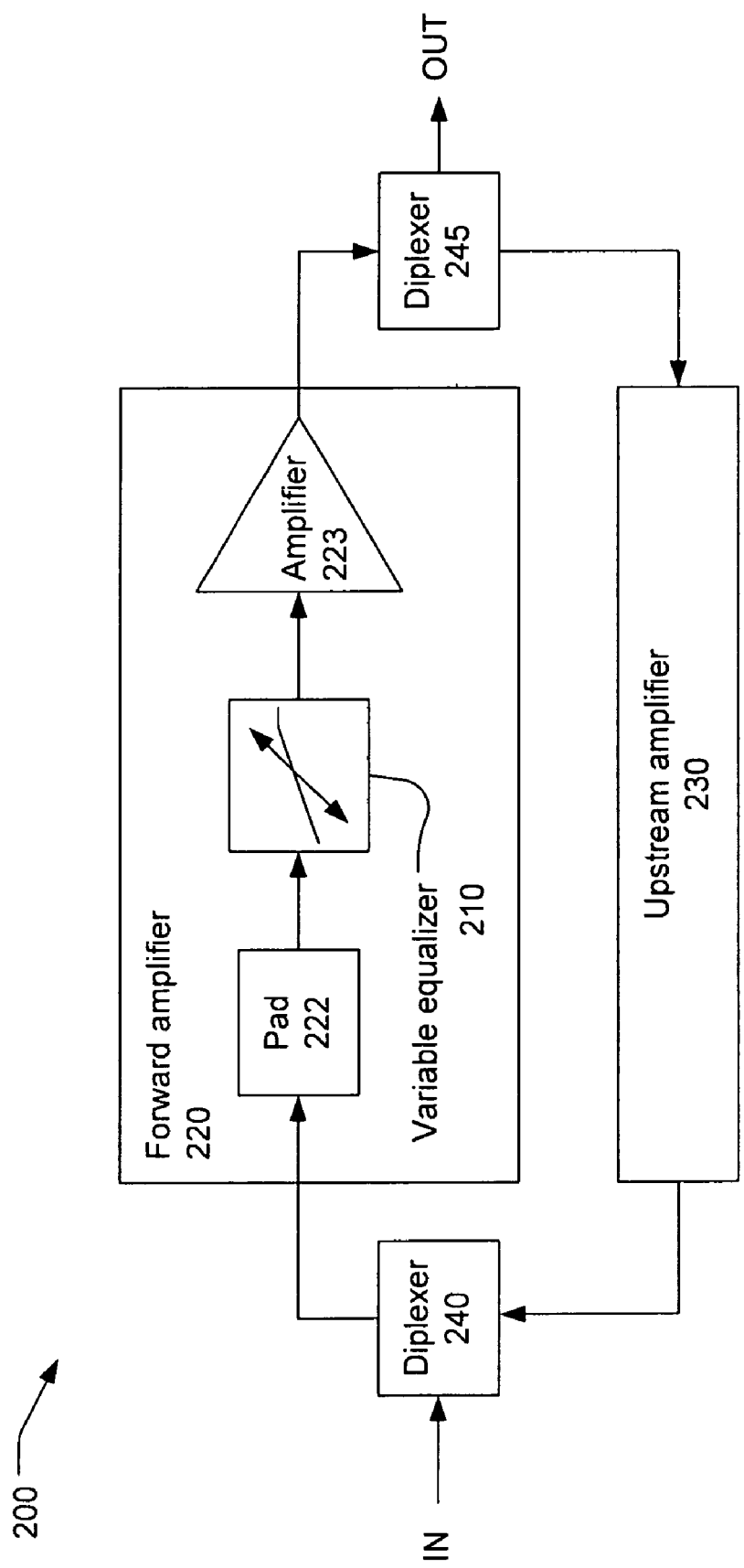
FIG. 2 is a block diagram of a line extender amplifier to be used in a cable network.

FIG. 2 shows a block diagram of an amplifier or "line extender" 200 for use in a cable network. The line extender 200 may include a variable equalizer 210, which may be the continuously variable equalizer 110 of FIG. 1. A line extender with circuitry similar to that shown in FIG. 2 may be placed at predetermined locations along the cable transmission network to compensate for transmission losses.

The input IN to the line extender 200 is at the left side of FIG. 1 and the output OUT is at the right side of FIG. 1. For this illustration, the direction of forward (downstream to the end user) signal propagation is from left to right, from IN to OUT. When a cable system is used to communicate Internet signals, or other two-way signals, the line extender 200 may also receive return signals at the output OUT to be transmitted upstream to the input IN. The direction of upstream signal propagation is from right to left in FIG. 1.

Diplexers 240 and 245 may ensure that forward signals pass through a forward amplifier 220 in the forward direction and that return signals pass through an upstream amplifier 230 in the upstream direction.

The forward amplifier 220 may include a resistive pad 222 or other broad-band attenuator, the variable equalizer 210, and an amplifier stage 223. The pad 222 may receive a forward signal from the diplexer 240. The attenuated output of the pad 222 may be applied to the input of the variable equalizer 210. The amplifier stage 223 may amplify the signal from the output of the variable equalizer 210. The amplified single may be coupled to the cable system through diplexer 245.

The amplifier stage 223 may be, for example, a monolithic or hybrid circuit amplifier. The amplifier state 223 may provide a fixed gain that is relatively uniform across the frequency spectrum of the signals transmitted over the cable system. The pad 222 may provide a fixed attenuation that is also relatively uniform across the frequency spectrum of the signals transmitted over the cable system. The pad 222 may plug into, or otherwise connect with, a circuit board containing the amplifier 223. The pad 222 may be removable and interchangeable with other pad devices providing different levels of attenuation. The gain of the amplifier 223 and the attenuation of the pad 222 may be selected to provide the desired signal level at the output of the amplifier 223.

The variable equalizer 223 may compensate for slope loss due to the attenuation characteristics of the cable transmission network with respect to frequency. Generally, the variable equalizer may be adjusted to provide a frequency response that is the opposite of the frequency response of the cable preceding the amplifier. When the equalizer is properly adjusted to compensate for the slope loss of the cable preceding the cable extender 200, the output signal from the cable extender 200 will have a flat level across the frequency spectrum of the signals transmitted over the cable system.

The cable extender 200 of FIG. 2 may be representative of typical forward amplifiers in use for cable transmission. Many other configurations are possible. For example, a cable extender may include a second amplifier stage or preamplifier, not shown in FIG. 2. The second amplifier stage may be connected in series with the amplifier 223, may be connected between the diplexer 240 and the pad 222, or may be connected at some other point in the cable extender. A variable equalizer, such as the continuously variable equalizer 110, may also be incorporated in the backward amplifier 230.

Figure 3:
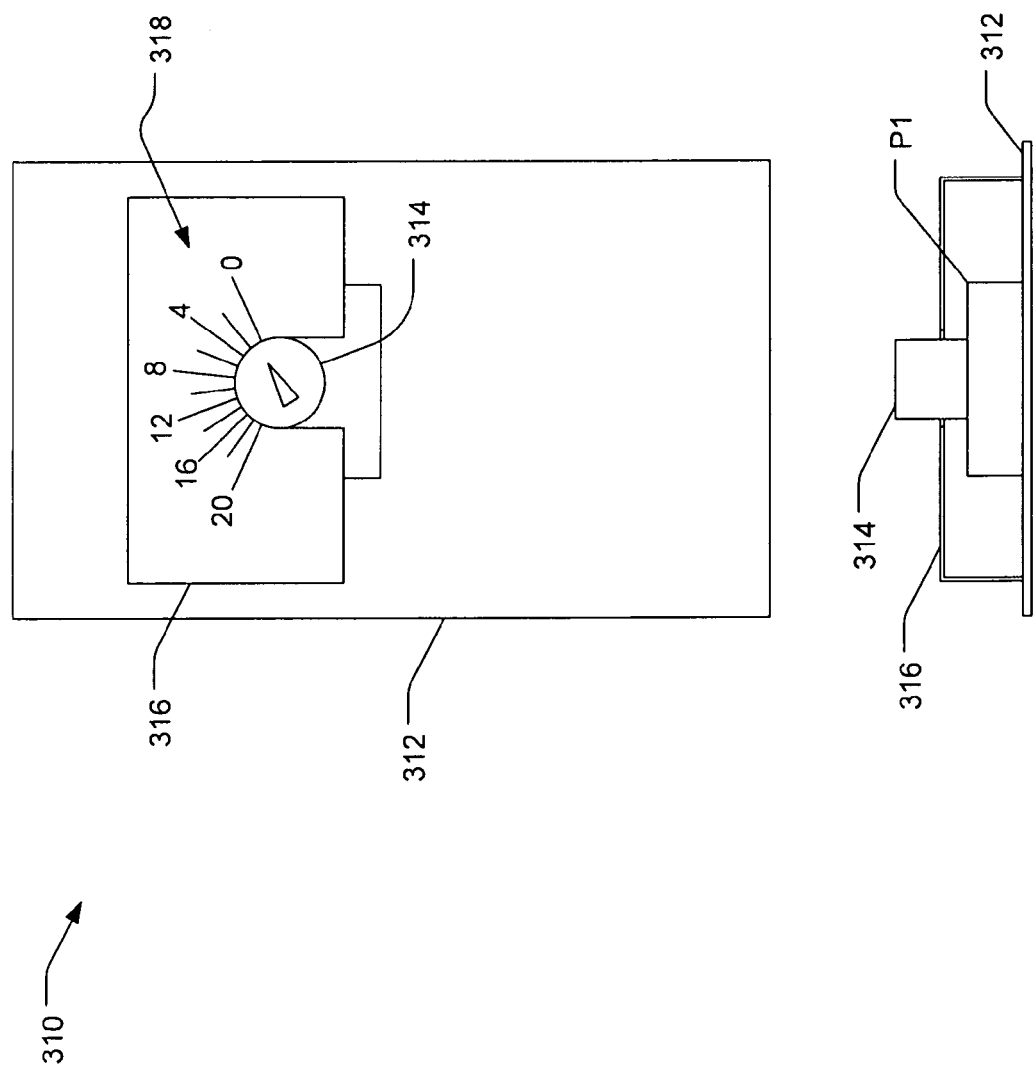
FIG. 3 is a view of an exemplary continuously variable equalizer module.

FIG. 3 shows an exemplary variable equalizer 310 which may be the continuously variable equalizer 110. The variable equalizer 310 may include a circuit board 312 on which an adjustable T-pad P1 is mounted. Other components of the variable equalizer 310, not shown in FIG. 3, may also be mounted on the circuit board 312. A mechanism to adjust the variable T-pad P1, such as a rotatable shaft 314, may extend from or be coupled to the variable T-pad. The circuit board 312 may support a dial 316 having indicia 318 to facilitate precise adjustment of the variable T-pad P1.

Figure 4:
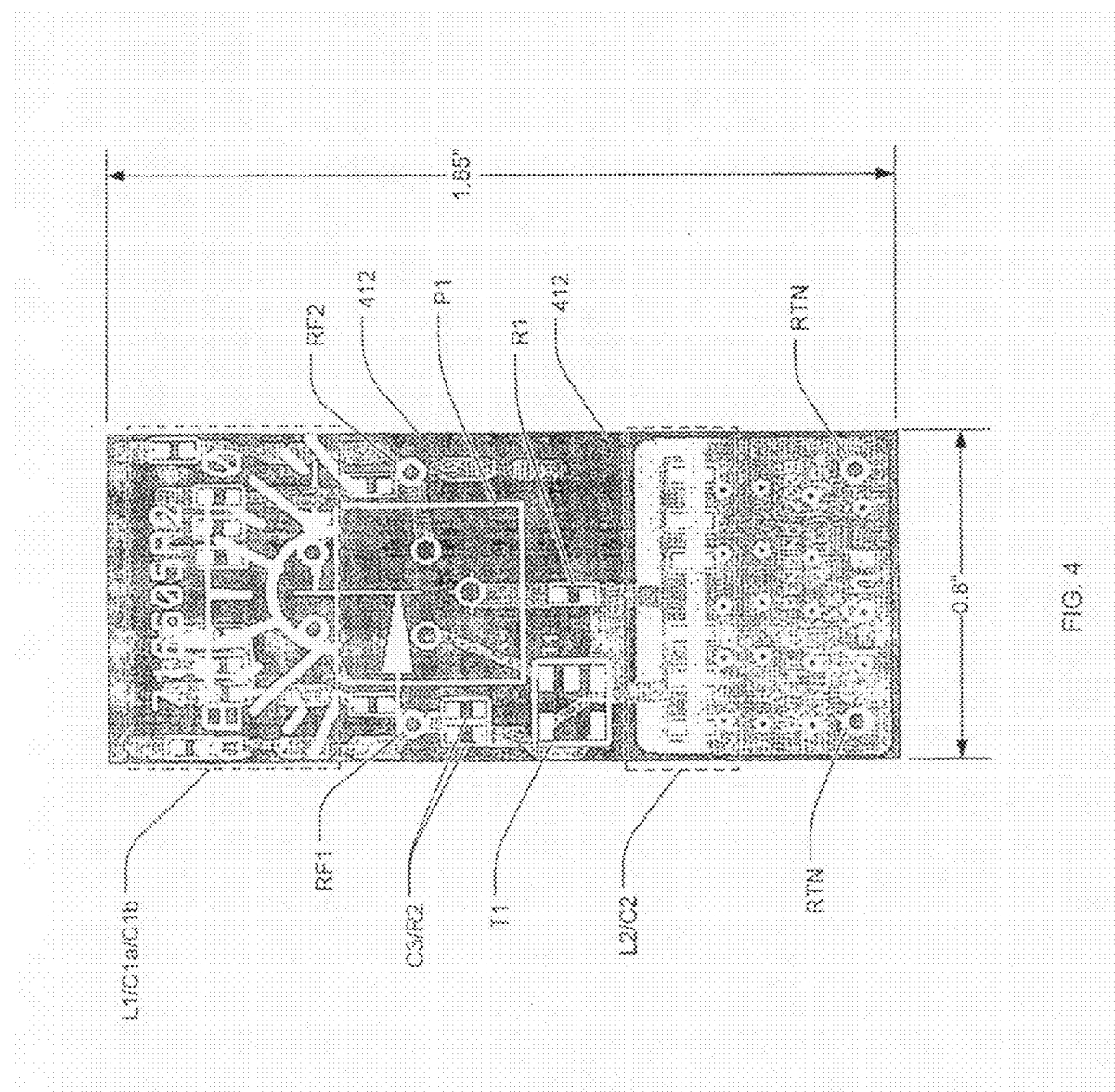
FIG. 4 is a circuit board layout of an exemplary continuously variable equalizer module.

FIG. 4 is a layout of a printed circuit board 412 for an embodiment of the continuously variable equalizer 110 of FIG. 1. The physical layout of FIG. 4 is an example of a printed circuit board for a variable equalizer, and other arrangements and layouts of the components of the continuously variable equalizer 110 are possible.

FIG. 4 identifies the locations of terminals RF1, RF2 and the associated RTN terminals. FIG. 4 also identifies the locations of discrete components R1, R2, and C3, the adjustable T-pad P1, and the balun transformer T1. The series tuned circuit (L1/C1a/C1b) and the parallel tuned circuit (L2/C2), as indicated by the dashed outlines, include both elements printed on the circuit board 412 and optional discrete components to allow flexibility is setting the resonant frequency of each tuned circuit.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A continuously variable equalizer, comprising:
   a series-tuned circuit connected between an RF signal input terminal and an RF signal output terminal,
   an adjustable T-pad having an input terminal coupled to the RF signal input terminal, an output terminal coupled to the RF signal output terminal, and a common terminal,
   a parallel-tuned circuit coupled between the T-pad common terminal and a signal return.

2. The continuously variable equalizer of claim 1, further comprising:
   a balun transformer having a first winding and a second winding, wherein
      a first end of the first winding is coupled to the RF input terminal,
      a first end of the second winding is connected to the T-pad input terminal,
      a second end of both the first and second windings is coupled to the T-pad common terminal.

3. The continuously variable equalizer of claim 2, wherein the continuously variable equalizer operates over a frequency range that spans cable television channels 2 through 158.

4. A line extender for a cable system, comprising:
an amplifier,
a variable equalizer, comprising:
    a series-tuned circuit connected between an RF signal input terminal and an RF signal output terminal,
    an adjustable T-pad having an input terminal coupled to the RF signal input terminal, an output terminal coupled to the RF signal output terminal, and a common terminal,
    a parallel-tuned circuit coupled between the T-pad common terminal and a signal return.

\* \* \* \* \*